United States Patent [19]
Pober

[11] Patent Number: 4,817,721
[45] Date of Patent: Apr. 4, 1989

[54] REDUCING THE PERMEABILITY OF A ROCK FORMATION

[75] Inventor: Kenneth W. Pober, Ponca City, Okla.

[73] Assignee: Conoco Inc., Ponca City, Okla.

[21] Appl. No.: 132,849

[22] Filed: Dec. 14, 1987

[51] Int. Cl.⁴ .......................................... E21B 33/138
[52] U.S. Cl. .................................. 166/295; 166/294; 523/130
[58] Field of Search ............... 166/270, 294, 295, 300; 405/264; 523/130, 132

[56] References Cited

U.S. PATENT DOCUMENTS

| | | | |
|---|---|---|---|
| 2,513,614 | 7/1950 | Barkhuff, Jr. | 166/295 |
| 2,842,206 | 7/1958 | Bearden et al. | 166/295 |
| 3,103,248 | 9/1963 | O'Brien | 166/295 |
| 3,145,773 | 8/1964 | Jorda et al. | 166/294 X |
| 3,199,588 | 8/1965 | Holbert | 166/295 |
| 3,379,253 | 4/1968 | Chism | 166/295 |
| 3,412,796 | 11/1968 | Dekking | 166/295 |
| 3,557,562 | 1/1971 | McLaughlin, Jr. | 166/295 X |
| 3,608,639 | 9/1971 | Hart | 166/295 X |
| 3,637,019 | 1/1972 | Lee | 166/295 |
| 4,250,963 | 2/1981 | Hess | 166/295 X |
| 4,391,555 | 7/1983 | Burger et al. | 166/294 |
| 4,582,137 | 4/1986 | Schmitt | 166/270 |
| 4,679,625 | 7/1987 | Gibbons | 166/270 |
| 4,735,265 | 4/1988 | Hoskin et al. | 166/270 X |

*Primary Examiner*—George A. Suchfield

[57] ABSTRACT

Permeability of a highly permeable zone in a subterranean formation is reduced by injecting into the formation a polymerizable material which expands on polymerization, and thereafter effecting such polymerization.

9 Claims, 1 Drawing Sheet

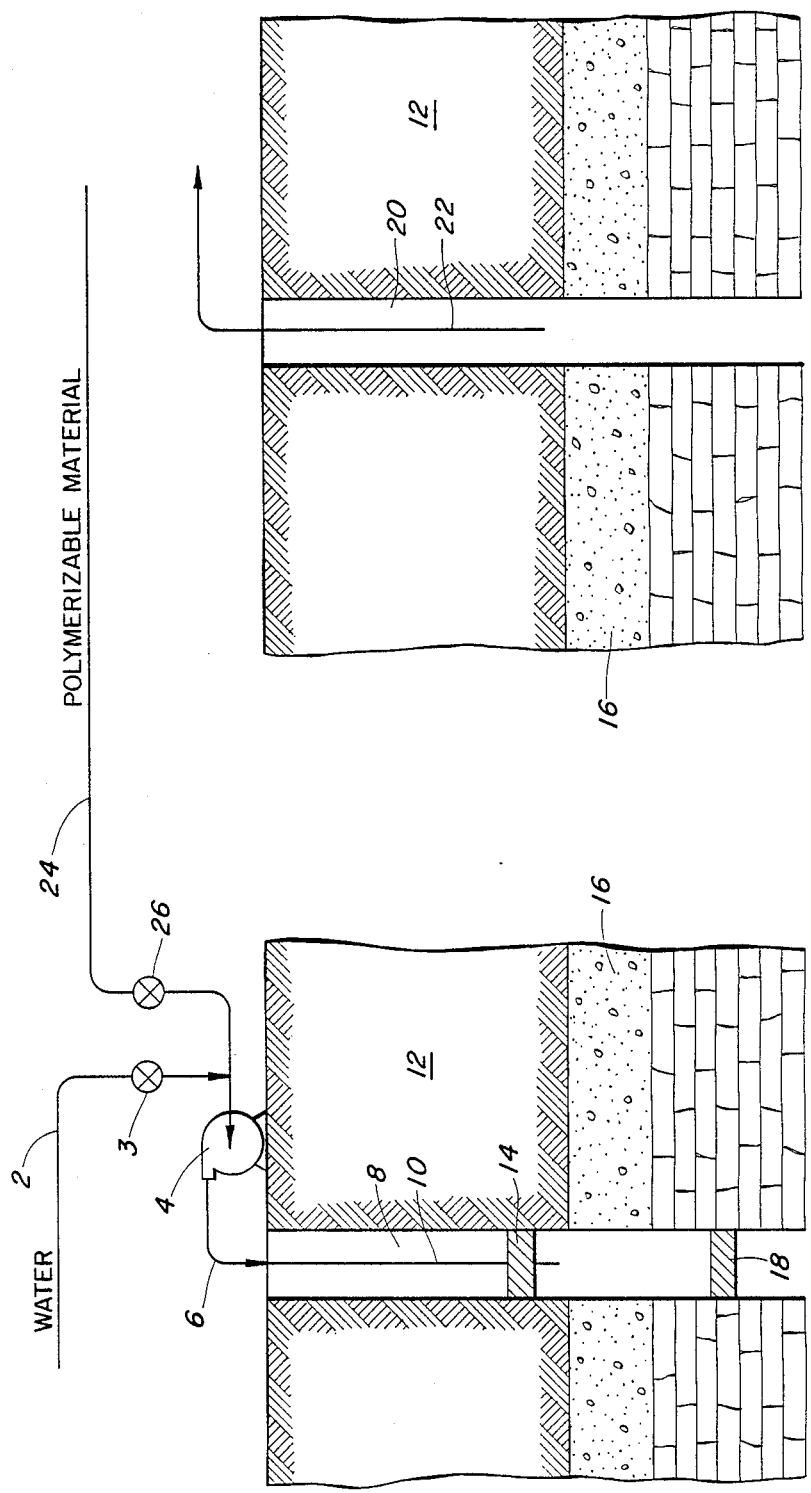

REDUCING THE PERMEABILITY OF A ROCK FORMATION

BACKGROUND AND SUMMARY OF THE INVENTION

The problem of fluid loss to highly permeable underground formations penetrated by a well has been long recognized. These highly permeable zones are often called thief zones. In water or steam stimulation operations, for example, a serious problem is often encountered because a very small interval of the total production zone may be taking 80 percent or more of the total injected fluid. When this happens, the benefit of the injection project may be lost or greatly reduced.

An isolated high-permeability zone or fracture can be plugged at the well bore face by a shallow layer of applied cement, though such a permanent relatively irrevocable technique often is undesirable. More desirably, a communicating high-permeability zone is plugged to some considerable depth in order to prevent flood water from otherwise merely flowing around a narrow shallow plug and back into the high-permeability or thief zone. Plugging of a relatively high-permeability zone to a substantial depth converts the zone into a much lower permeability zone. Then, subsequently injected flood water or other fluid will tend to enter the formerly by-passed by now relatively more permeable hydrocarbon-bearing zones and thus mobilize increased amounts of hydrocarbons.

Various methods have been used in the past to achieve in depth plugging, such as gelable systems triggered by a following aqueous acidic solution injection for subsequent pH adjustment. However, injecting an acidic solution following the gelable solution may result in such rapid gelation that sufficient in depth plugging is not obtained in the most permeable strata where desired. In another method, water, a polymer and a cross-linking agent capable of gelling the polymer such as a sequestered polyvalent metal cation, are admixed, and, just before injection into an underground formation, an acid is added thereto to effect gelation. But, when the acid is pre-mixed with the gelable composition, the gelation reaction can be too fast, making it necessary to shear the gelled polymer in order to obtain adequate injection, which reduces effectiveness of the gel. Also, gels are limited as to structural integrity. A gel may fill up the pore space of a given zone, however, gels do not have adequate mechanical strength. They deform under load (100 to 5000 psi water pressure) and allow water to pass, just as before gel treatment.

A wide variety of polymers and copolymers have been used for permeability reduction with varying degrees of success. These polymers include among others, the materials disclosed in the patents listed as prior art. The disclosed polymers suffer from the disadvantage that they all shrink or decrease in volume on polymerization. When such materials are pumped into a zone of high permeability and set up, the adhesion of the polymer is poor, which allows fluid channeling through or around the polymer. The polymers generally will have good mechanical strength and will hold up under load. However, the shrinkage which occurs during polymerization of monomer to polymer leaves open pore space in the high permeability zone. As a result, water at 100 to 5000 psi will easily channel through the polymer. The degree of shrinking encountered varies with the polymer, e.g. ethylene polymer shrinks 66%, vinyl acetate 21% and 1-vinylpyrene 6%.

According to this invention, substantial reduction in the permeability of a highly permeable zone in an underground formation is achieved by introducing into the formation through a well bore a polymerizable material which remains constant in volume or expands on polymerization and thereafter allowing polymerization of such material to take place. If necessary, a catalyst is used to effect the polymerization reaction.

PRIOR ART

U.S. Pat. No. 3,199,588 describes a generalized process wherein monomer or monomers and a polymerization catalyst are injected into a thief zone, followed by injection of a polymerization catalyst. Polymerization of the monomer and plugging of the thief zone are thereby effected.

U.S. Pat. Nos. 3,412,796; 4,250,963 and 4,391,555 disclose the use of various polymers for the consolidation of formations and plugging of zones. Monomers disclosed are vinyl monomers, such as styrene, and drying oils, such as linseed oil.

BRIEF DESCRIPTION OF THE DRAWING

The drawing is a schematic diagram, partially in cross-section, of an apparatus arrangement illustrating the invention.

DETAILED DESCRIPTION OF THE INVENTION

Referring now to the drawing, there is provided a well 8 which penetrates an earth formation 12. This well also penetrates a streak or zone 16 of high permeability. Tubing string 10 provides fluid communication from the surface through the wellhead to the porous formation 16. Suitable surface tubing 6 connects tubing string 10 with the discharge of pump 4. In a waterflood operation, water is introduced to the injection well through line 2, valve 3, pump 4, and line 6. Block valve 26 is closed during this operation. Some distance from the injection well there is provided a production well 20 which also traverses earth formation 12 and permeability zone 16. After the waterflood has been in operation for some time, it is found that water entering the injection well passes primarily through permeable zone 16 and into the production well, from which it passes to the surface through tubing string 22. As a result, little or no oil is produced from other zones in contact with the production well. In order to remedy this problem, it is necessary to reduce the permeability of zone 16 so that water introduced in the injection well will preferentially flow through other oil bearing zones and thus force the oil into the production well. As a first step, a polymerizable material which expands on polymerization, such as a bicyclic lactone, is introduced through line 24 and valve 26 and is pumped through pump 4 and line 6 into tubing string 10. If necessary to effect polymerization, a catalyst is introduced with the polymerizable material. Block valve 3 is closed during this operation. For best results, permeable zone 16 is isolated from nearby zones by using a bridge plug 18 and setting a treatment packer 14. Upon leaving tubing string 10, the polymerizable material enters into permeable zone 16 flowing toward the production well 20. Once the desired treatment volume has been injected, the polymerizable material remaining in tubing string 10 is displaced into the formation with a spacer fluid, such as fresh water via line 2.

In general, any polymerizable material which remains constant in volume or expands on polymerization may be used in the process of the invention. The invention contemplates the use of such materials as bicyclic lactones which have the formula:

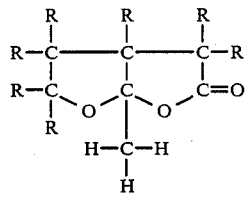

wherein R may be hydrogen, alkyl, branched alkyl or aromatic, halogen, amino, alcohol, carboxylic acid, ester, nitro, ether, hydroxy and the like.

A specific example of the polymerization of a bicyclic lactone is as follows:

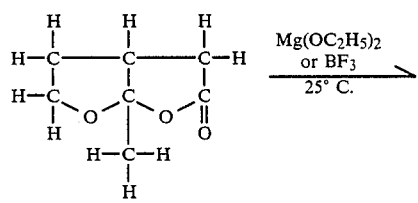

8-Methyl-2-oxo-hexahydro-furo [2,3-b]-furan

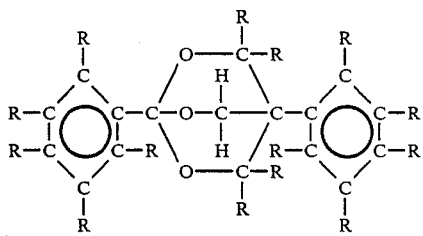

Keto polyester
0% contraction

Another type of material which may be used in a bicyclic ortho ester, having the formula:

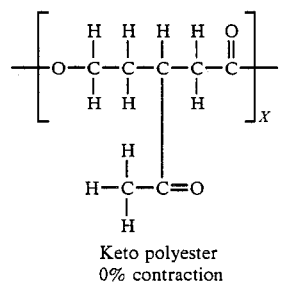

wherein R may be the same as for the bicyclic lactones.

A typical example of a bicyclic ortho ester polymerization is:

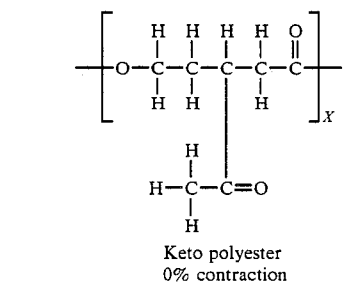

1,4-Diphenyl-2,6,7-trioxabicyclo [2.2.2] octane

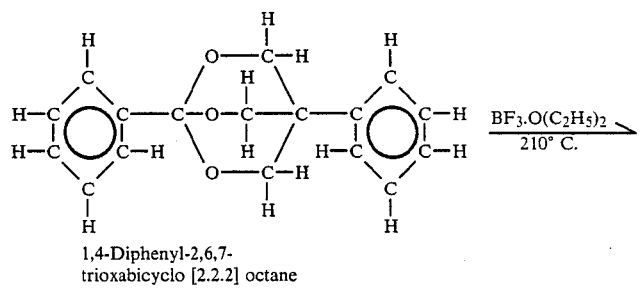

Ester polyether
1.3% expansion

Another example of a bicyclic ortho ester polymerization is:

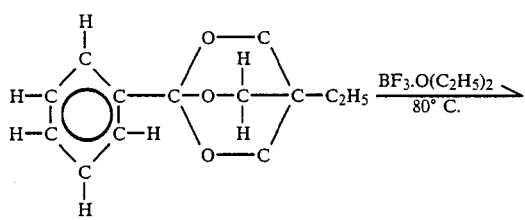

1-Phenyl, 4-ethyl-2,6,7-
trioxabicyclo[2.2.2]octane

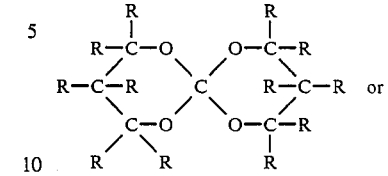

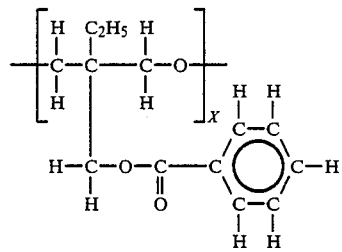

Ester polyether
0.2% expansion

Another type of material used is the spiro orthocarbonate having the formula:

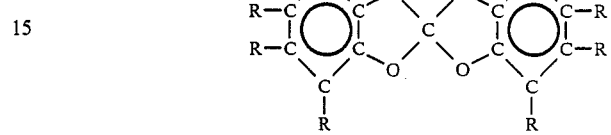

wherein R may be the same as for the bicyclic lactones.

Following are specific polymerization reactions of spiro ortho carbonates:

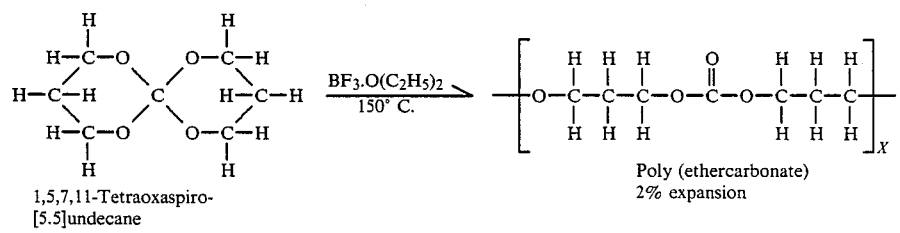

1,5,7,11-Tetraoxaspiro-
[5.5]undecane

Poly (ethercarbonate)
2% expansion

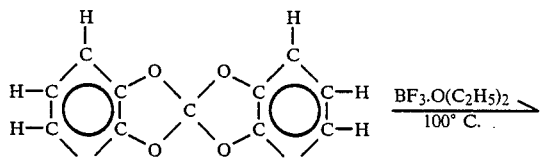

2,3,7,8-Dibenzo-1,4,6,9-
tetraoxaspiro[4.4]nonadiene

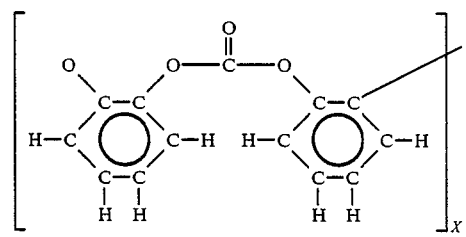

Polycarbonate
3-4% expansion

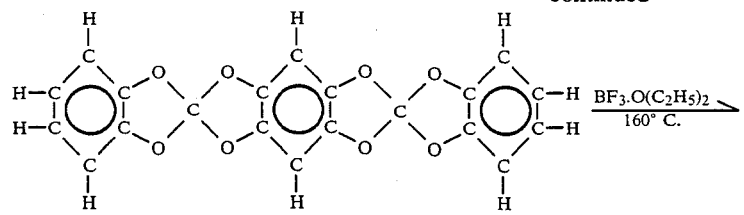
3,4,3'',4''-Dibenzo-2,5,1',3',5',7',2'',5''-
Octaoxadispiro[cyclopentene-1,2']-
1',2',3',5',6',7'-hexahydro-S—indacene-
6',1''-cyclopentene
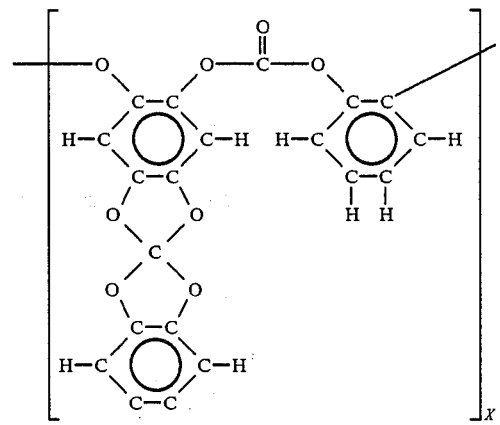
Polycarbonate
~5.0% expansion
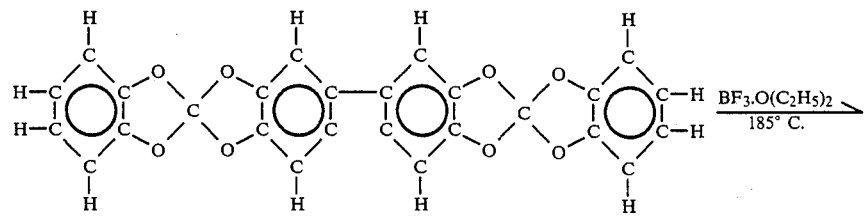
2',2''-bis-2,3,7,8-Dibenzo-1,4,6,9-
tetraoxaspiro[4.4]nonadienyl
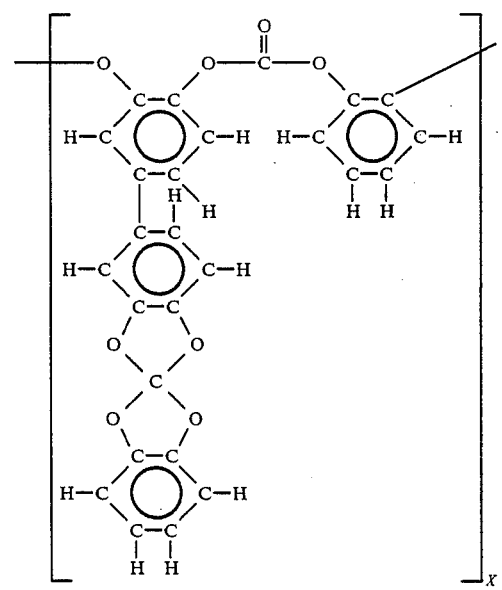
Polycarbonate
5.4% expansion -continued
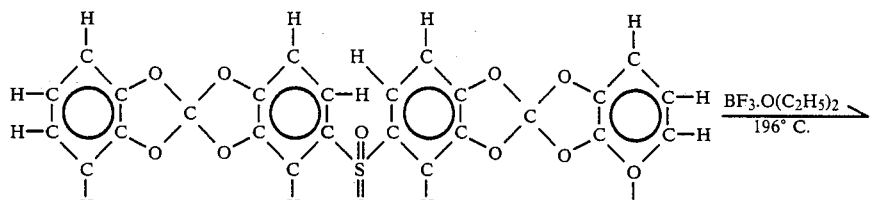
2',2" bis-2,3,7,8-Dibenzo-1,4,6,9-
tetraoxaspiro [4.4] nonadienyl sulfone
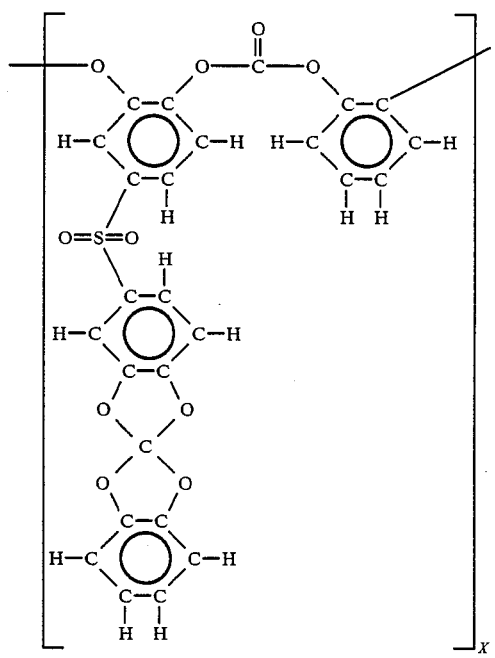
Polycarbonate
3.6% expansion
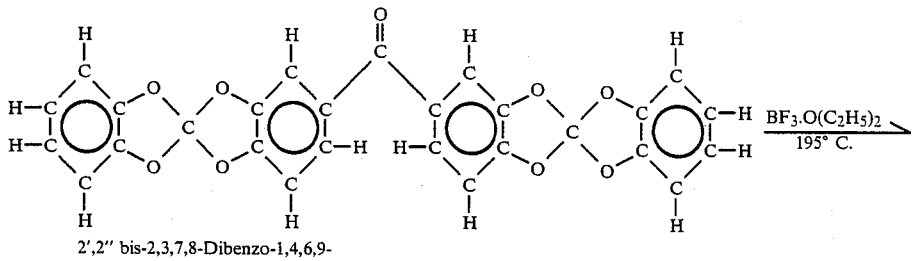
2',2" bis-2,3,7,8-Dibenzo-1,4,6,9-
tetraoxaspiro[4.4]nonadienyl ketone
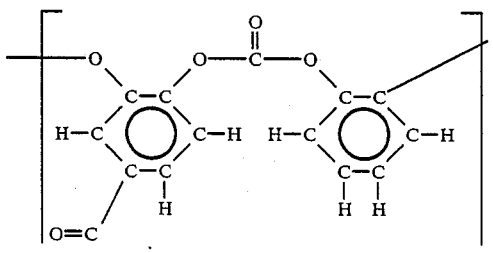

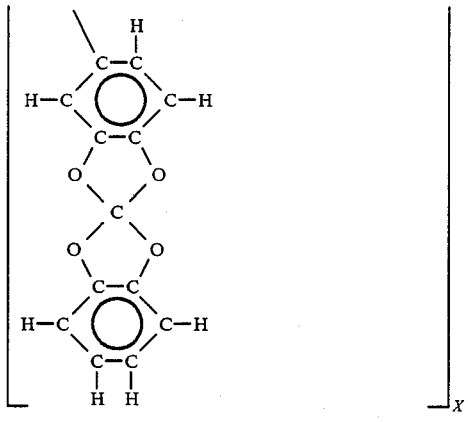

Polycarbonate
2.9% expansion

In addition to the foregoing, other materials which remains constant in volume or expand on polymerization may be used in the practice of the process of the invention.

Returning now to the drawing, after a suitable period of time the polymerizable material introduced into permeable zone 16 forms an expanded polymer and a solid, very strong polymer-rock composite which effectively reduces the permeability of zone 16. Thereafter, well 8 is placed back in service along with well 20. When water injection is resumed, water is forced into zones (not shown), other than zone 16, which contain oil, thereby increasing the production of oil from the formation.

The polymerizable materials used in the process often require a catalyst to effect polymerization. In addition to the catalysts disclosed in the specific polymerization examples, other conventional catalysts tailored to the specific polymerizable materials may be employed. Usually the catalyst comprises between about 0.1 and about 5.0 percent by weight of the polymerizable material. The time required for polymerization will vary, and is usually between about 1 and about 24 hours. Since polymerization in many cases is temperature dependent, the time required will depend on the temperature of the formation and the type and amount of catalyst used. The majority of oil formations range in temperature between about 25° C. and about 150° C. although higher temperatures may be encountered, particularly in deep formations.

The time required for polymerization also depends on the polymerizable material used and the substituents which are present in this material. Thus, with the formation temperature known, it is possible to select a polymerizable material and, with a given catalyst, establish the time which will be required to effect polymerization.

When used, the polymerization catalyst is preferably introduced to the zone of high permeability along with the polymerizable material. The two materials may be mixed alone or may be placed in a suitable diluent or carrier material, such as kerosine, distillate or crude oil. When the polymerizable material is a solid, it may be dissolved in a suitable solvent prior to introduction to the formation. The solvent may be an aromatic material or one of the carrier materials mentioned. As an alternative, the polymerizable material may be finely subdivided and introduced to the formation as a slurry in a carrier fluid.

It is also within the scope of the process to introduce the catalyst separately, either prior to or after introduction of the polymerizable material. If desired, the polymerizable material and/or the catalyst may be introduced into the formation in increments over a period of time. Also, the entire process may be repeated one or more times in order to attain a desired permeability reduction.

The volume of polymerizable material injected into the formation to be treated is determined by the size of the zone of high permeability. Typically, volumes from about 5 to about 100 percent of the pore volume of the zone to be treated are used.

The following example illustrates the results obtained in carrying out the invention.

EXAMPLE 1

In a waterflood of an oil-bearing formation, salt water is injected for six months. The well is completed open hole. At the end of this time, the well is logged and it is found that 70 percent of the injection water is being lost into a thief zone.

160,000 liters of kerosine containing 80,000 liters of a spiro orthocarbonate and 950 kilograms of $BF_3 \cdot O(C_2H_5)_2$ is introduced into the injection well over a period of 12 hours. Upon completion of the injection, that portion of the injected material remaining in the well bore is displaced into the formation with diesel fuel. Within 24 hours after injection, the spiro orthocarbonate polymerizes, thereby plugging the entire thief zone. Upon logging the injection well a second time, it is determined that the thief zone is now taking only 10 percent of the injection water. Thus, the permeability of the thief zone is substantially reduced by the method of the invention.

I claim:

1. A process for reducing the permeability of a subterranean formation traversed by a well bore which comprises introducing into the formation via the well bore a polymerizable material which remains constant in volume or expands on polymerization, said polymerizable material being selected from the group consisting of bicyclic lactones, bicyclic ortho esters and spiro orthocarbonates, and thereafter allowing such polymerization to take place.

2. The process of claim 1 in which the polymerization is effected with a catalyst.

3. The process of claim 2 in which the catalyst is introduced into the formation with the polymerizable material.

4. The process of claim 2 in which the catalyst is introduced into the formation separate from the polymerizable material.

5. A process for reducing flow into a porous thief zone penetrated by a water injection well bore which comprises injecting down said well bore and into said porous thief zone a mixture of a catalyst and a polymerizable material which remains constant in volume or expands on polymerization, said polymerizable material being selected from the group consisting of bicyclic lactones, bicyclic ortho esters and spiro orthocarbonates, and thereafter allowing polymerization to take place.

6. The process of claim 5 in which the catalyst is selected from the group consisting of $BF_3$, $Mg(OC_2H_5)_2$ and $BF_3.O(C_2H_5)_2$.

7. A process for reducing the permeability of a subterranean formation traversed by a well bore which comprises:
  (a) injecting into the formation via the well bore in a carrier fluid, a catalyst and a polymerizable material which remains constant in volume or expands on polymerization, said polymerizable material being selected from the group consisting of bicyclic lactones, bicyclic ortho esters and spiro orthocarbonates;
  (b) injecting water into the formation;
  (c) injecting into the formation a further amount of carrier fluid containing said catalyst and polymerizable material;
  (d) injecting additional water into the formation; and
  (e) allowing polymerization to take place.

8. The process of claim 7 in which the catalyst is selected from the group consisting of $BF_3$, $Mg(OC_2H_5)_2$ and $BF_3.O(C_2H_5)_2$.

9. The process of claim 8 being repeated a sufficient number of times to attain a desired permeability reduction.

* * * * *